United States Patent [19]

Beim

[11] Patent Number: 5,503,605
[45] Date of Patent: *Apr. 2, 1996

[54] MULTIPLE SPEED AUTOMATIC TRANSAXLE FOR AUTOMOTIVE VEHICLES

[75] Inventor: Rudolf Beim, Bloomfield Hills, Mich.

[73] Assignee: Ford Motor Company, Dearborn, Mich.

[*] Notice: The term of this patent shall not extend beyond the expiration date of Pat. No. 5,429,557.

[21] Appl. No.: 215,143

[22] Filed: Mar. 21, 1994

[51] Int. Cl.⁶ .................................................. F16H 3/44
[52] U.S. Cl. .......................... 475/283; 475/218; 475/275; 475/903
[58] Field of Search .................................. 475/282, 283, 475/903, 218, 275, 285

[56] References Cited

U.S. PATENT DOCUMENTS

| | | |
|---|---|---|
| 2,886,809 | 6/1959 | Kiss . |
| 3,094,013 | 6/1963 | Ferguson . |
| 3,265,175 | 8/1966 | Croswhite . |
| 3,482,469 | 12/1969 | Mori . |
| 3,659,479 | 5/1972 | Kiss . |
| 4,224,838 | 9/1980 | Roushdy et al. ........................ 475/903 |
| 4,404,869 | 9/1983 | Numazawa et al. . |
| 4,416,168 | 11/1983 | Arai et al. . |
| 4,572,026 | 2/1986 | Weiss . |
| 4,624,154 | 11/1986 | Kraft et al. . |
| 5,039,305 | 8/1991 | Pierce . |
| 5,106,352 | 4/1992 | Lepelletier ............................. 475/280 |
| 5,129,870 | 7/1992 | Pierce .................................. 475/278 X |
| 5,261,862 | 11/1993 | Pierce ....................................... 475/275 |
| 5,267,913 | 12/1993 | Beim et al. ............................. 475/218 |
| 5,267,916 | 12/1993 | Beim et al. ............................. 475/285 |

FOREIGN PATENT DOCUMENTS

| | | |
|---|---|---|
| 58-163849 | 7/1983 | Japan . |
| 1402442 | 4/1972 | U.S.S.R. . |
| 1044480 | 2/1981 | U.S.S.R. . |
| 1020266 | 5/1983 | U.S.S.R. . |

Primary Examiner—Charles A. Marmor
Assistant Examiner—Peter Kwon
Attorney, Agent, or Firm—Frank G. McKenzie; Roger L. May

[57] ABSTRACT

An automatic transmission for a motor vehicle includes first and second (36, 30) gearsets, two concentrically arranged planetary gear units (44, 54), certain elements of which are continually interconnected, friction clutches (76, 78, 90), brake band (88), friction brake (92), and overrunning coupling (80). The input shaft of the transmission is adapted to drive elements of the planetary gear units through an underdrive gear set and an over drive gear set. A single gear wheel (57) is formed with the ring gear (48) of the first gear unit and the sun gear (56) of the second gear unit. Carriers (50, 60) of the gear units are connected to an output shaft (64), which drives output gearing (66, 68) and a differential mechanism (70).

7 Claims, 2 Drawing Sheets

| Gear | CL1 76 | CL3 78 | CL4 90 | B1 88 | B2 92 | OWC1 80 Drive | OWC1 80 Coast | Coast Break |
|---|---|---|---|---|---|---|---|---|
| 1M | X | | | X | | N/A | | YES |
| 1 | X | | | | | X | O/R | NO |
| 2 | X | | | | X | O/R | O/R | YES |
| 3 | X | X | | | | O/R | O/R | YES |
| 4 | X | | X | | | O/R | O/R | YES |
| 5 | | X | X | | | O/R | O/R | YES |
| 6 | | | X | | X | O/R | O/R | YES |
| R | | X | | X | | N/A | | YES |

MULTIPLE SPEED AUTOMATIC TRANSAXLE FOR AUTOMOTIVE VEHICLES

BACKGROUND OF THE INVENTION

1. Field of the Invention

The present invention relates to the clutch, brake, and gear arrangement of an automatic transmission for motor vehicles, particularly to such arrangements that combine planetary gear units and layshaft gearsets.

2. Description of the Prior Art

Four-speed automatic transmissions conventionally include multiple planetary gearsets; five or six friction elements such as hydraulically actuated clutches and brakes; a torque converter; and damped torque converter lock-up clutch. These transmissions are employed in rear-wheel drive vehicles wherein the transmission shafts engine crankshaft are parallel to the longitudinal axis of the vehicle, and front-wheel drive vehicles wherein the transaxle and engine crankshaft are parallel to the transverse axis of the vehicle.

A current trend in the automotive industry is to provide five-speed and six-speed automatic transmissions, which conventionally require three planetary gear units and even a larger number of friction elements to control the gearing than are required in four-speed transmissions. Automatic transmissions having five or six forward speed ratios require greater size, particularly increased length, to accommodate additional planetary gear unit and friction elements. Furthermore, automatic transmissions require nonsynchronous gearshifting, which conventionally require still greater use of one-way couplings and more space within the transmission casing, particularly increased length.

These trends toward features that enhance performance of automatic transmissions have produced a need for an extremely compact transmission suitable for use in a front-wheel drive vehicle and able to fit in a space that is greatly reduced in comparison to the space required for conventional five-speed or six-speed automatic transmissions. Front-wheel drive vehicles present particularly acute problems because of the inherent space limitation associated with packaging the transmission and engine with their axes directed transversely between the drive wheels of the vehicle.

U.S. Pat. No. 5,106,352 describes a multiple-speed automatic transmission having two gearsets comprising constant mesh gear wheels, a double planetary gearset, and first and second control brakes. The transmission is able to provide six forward speeds, brake neutral and reverse drive.

SUMMARY OF THE INVENTION

It is an object of this invention to provide a multiple-speed automatic transmission in a highly compact form requiring a minimal number of friction elements to control operation of the components of the gear units and gearsets that produce the various speed ratios. The transmission is suitable for use in nonsynchronous and synchronous modes of operation.

A transmission according to this invention includes a combination of planetary gear units and conventional layshaft gearsets, the gear units and gearsets being arranged such that elements of the gear units are driven from the input shaft through the layshaft gearsets at two different speeds ratios.

An advantage of the gear arrangement, according to this invention, is its compact size, particularly the reduction in overall length of the transmission and the gear box required to contain the transmission. An additional advantage is the low number of hydraulically actuated friction elements required to control the elements of the planetary gear units.

In realizing these advantages and objectives, a transmission according to the present invention includes an underdrive gearset and an overdrive gearset drivably connected to an input shaft, and first and second planetary gear units drivably connected to an output shaft. Each planetary gear unit includes a sun gear, ring gear, pinions meshing with the sun gear and ring gear, and a carrier rotatably supporting the pinions. The ring gear of the first gear unit and sun gear of the second gear unit are formed on a common gear wheel. The sun gear of the first gear unit and the common gear wheel are connected through the first layshaft gearset to the input shaft. The ring gear of the second gear unit is connected through the second gearset and friction clutch to the input shaft. The carriers of the gear units are mutually drivably connected to the output shaft.

The control elements of the transmission hold the sun gear of the first gear unit and components connected to that sun gear against rotation on the transmission casing. A friction clutch releasably connects the first gearset and the first sun gear. Another friction clutch releasably connects the first gearset to the common gear wheel. A friction brake releasably connects the common gear wheel and transmission housing, and a brake band connects the second ring gear and the transmission housing.

A transmission according to the invention produces up to six forward speed ratios, reverse drive and first speed ratio in a manually selected range. It requires only three hydraulically actuated friction clutches, a friction brake, and brake band. Overrunning couplings can be included to provide nonsynchronous gear shifts.

DESCRIPTION OF THE PREFERRED EMBODIMENT

Figure 1:
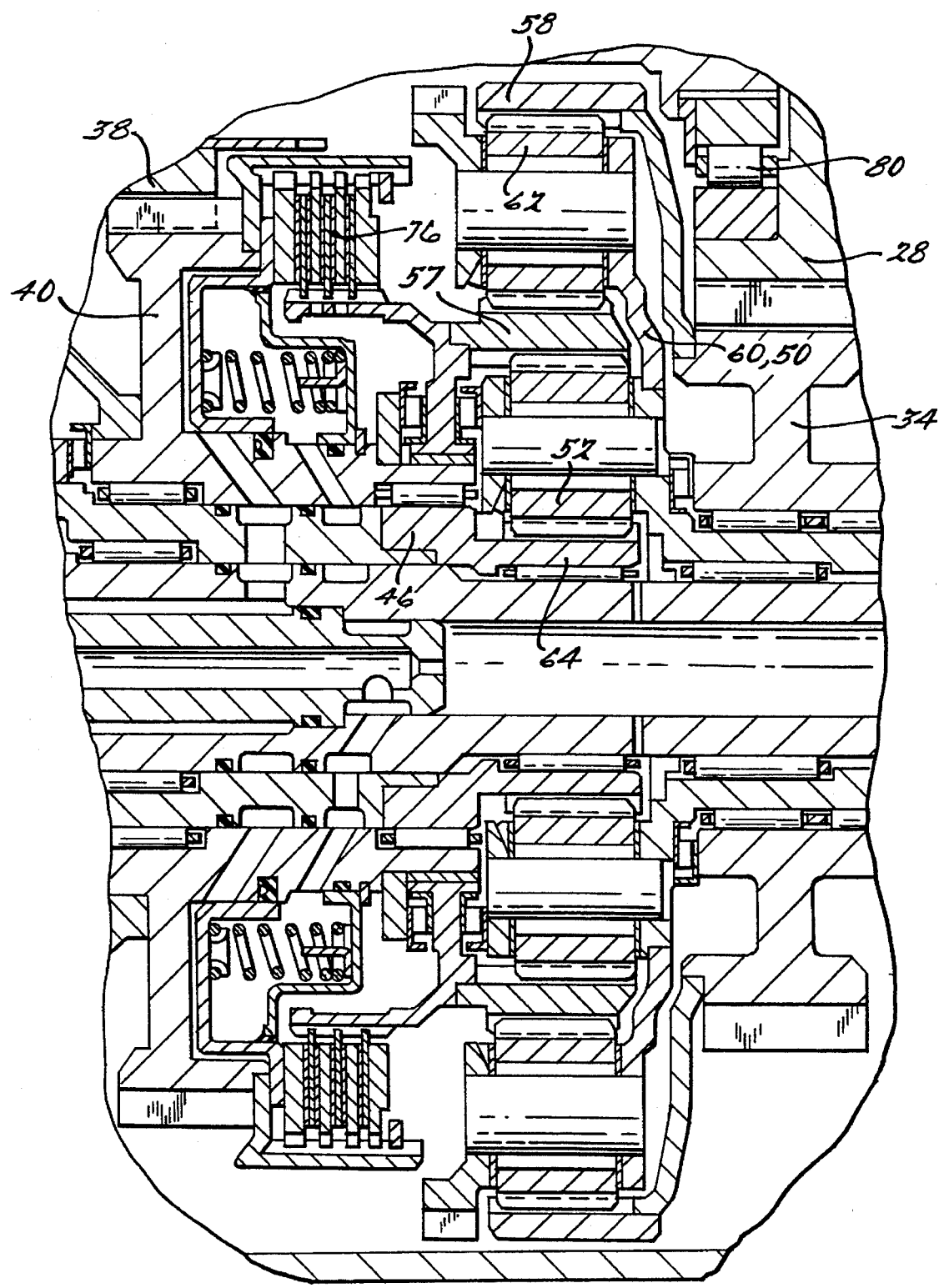
FIG. 1 is a cross section of a portion of an automatic transmission according to this invention.

An engine crankshaft 10 is drivably connected to a bladed impeller 12 of a hydrokinetic torque converter 14, which further includes a bladed turbine 16 and bladed stator 18. The impeller, turbine, and stator define a toroidal flow path in which hydraulic fluid circulates, thereby producing a hydrokinetic drive connection between the impeller and turbine. The stator is mounted on a stator shaft 20 through an overrunning coupling 22, which produces one-way drive connection between the stator rotor 18 and shaft 20. A torque converter bypass clutch 24, an hydraulically actuated friction element, is engaged to directly, drivably connect crankshaft 10 to a transmission input shaft 26, and is released so that the crankshaft drives the input shaft through the hydrokinetic connection produced by torque converter 14.

Input shaft 26 is releasably connected to a first pinion 38 of a first layshaft gearset 36. Pinion 38, which is supported rotatably on input shaft 26, is in continual meshing engagement with gear 40 of the first gearset.

A second layshaft gearset 30 includes a pinion 28, fixed to shaft 32, and a gear 34, which is in continual meshing engagement with pinion 28.

Shaft 10 drives an hydraulic pump 42, which is supplied with hydraulic fluid from a sump. The pump outlet side is connected to an hydraulic control and actuation circuit, through which the torque converter 14 is continually supplied with a source of pressurized hydraulic fluid. Bypass clutch 24, one of a number of hydraulically actuated friction elements, viz., clutches and brakes, is engaged by pressurizing fluid lines leading to the bypass clutch and venting those lines to release the bypass clutch.

A first simple planetary gear unit 44 includes sun gear 46, ring gear 48, carrier 50, and a set of planetary pinions 52, rotatably supported on carrier 50 and in continuous meshing engagement with ring gear 48 and sun gear 46.

A second simple planetary gear unit 54 includes sun gear 56, ring gear 58, carrier 60, and a set of planetary pinions 62, supported rotatably on carrier 60 and in continuous meshing engagement with sun gear 56 and ring gear 58. Ring gear 48 and sun gear 56 are formed on the radially inner and outer surfaces, respectively, of a common gear wheel 57.

Carriers 50, 60 are mutually drivably connected. They are drivably connected to output shaft 64 by a radial member 65.

The final drive gearing includes output pinion 66 and output gear 68, which is in continual meshing engagement with pinion 66 and drives the spindle of a differential 70, located between axleshafts 71, 72, which transmit power to the drive wheels of the vehicle.

Gear 40 of gearset 36 is rotatably supported on an axially directed element 74, which drivably connects clutch 76 and clutch 78. Sun gear 46 and element 74 are drivably connected and released through operation of clutch 78; wheel 57 and element 74 are drivably connected and released through operation of clutch 76.

Gear 34 of gearset 30 is drivably connected by element 80 to ring gear 58 of the planetary gear unit 54. The pinion 28 of gear unit 30 is drivably connected to an overrunning coupling 80, which provides a one-way drive connection between shaft 32 and an immovable component 82 such as the transmission housing 82. A radial member 84 connects shaft 32 to a brake drum 86, which is held by application of brake band 88 against rotation on the transmission housing.

Clutch 90 drivably connects and releases input shaft 26 and shaft 32. Pinion 28 and a race of one-way coupling 80 are drivably fixed to shaft 32. Therefore, there are two torque delivery paths between pinion 28 and the transmission housing. The first of these paths is through one-way coupling 80, the second path is through radial member 84 and brake band 88.

A second brake 92 alternately drivably connects and releases sun gear 46 and transmission housing 82.

Figures 2, 3:
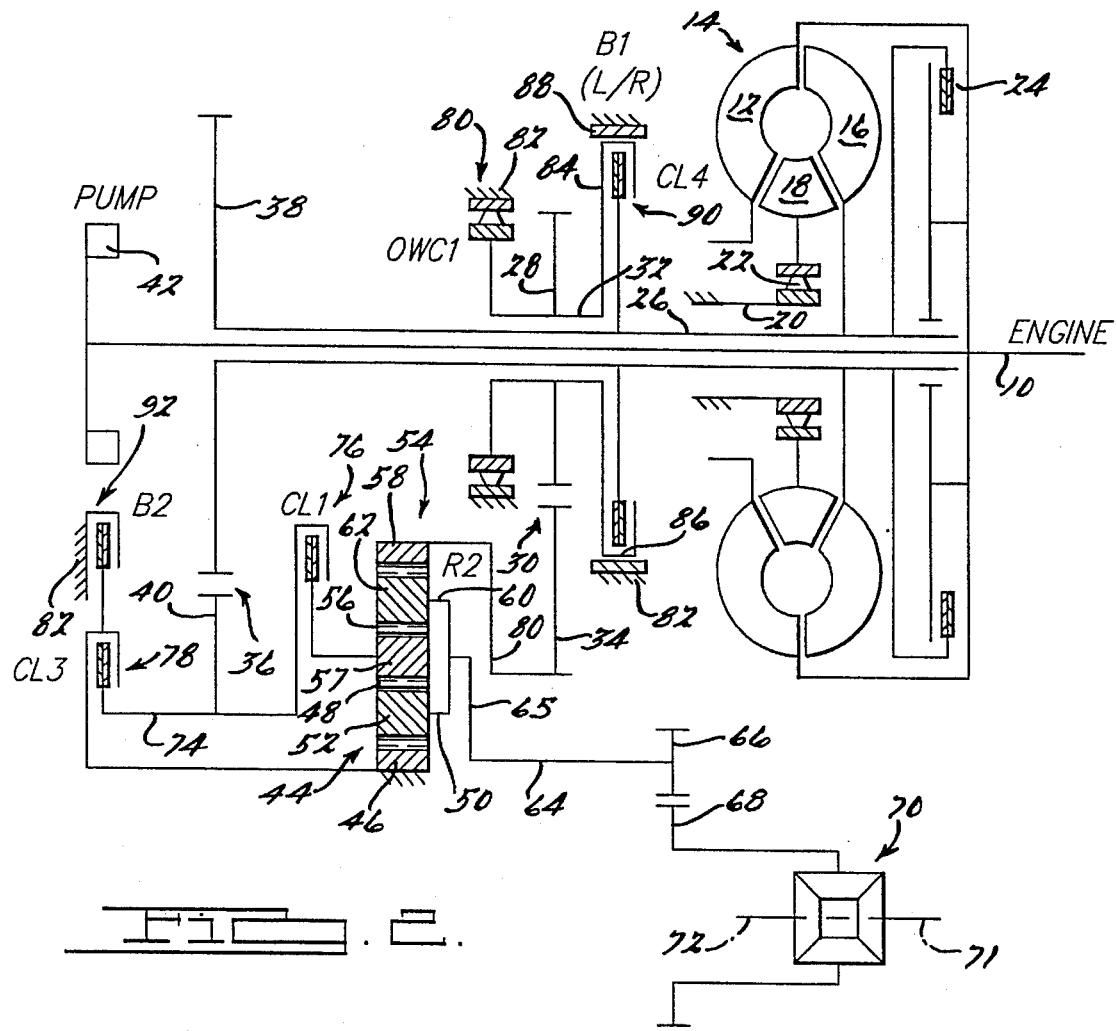
FIG. 2 is a schematic diagram showing an arrangement of gearing, couplings, clutches, and brakes for a transaxle according to this invention.
FIG. 3 is a schedule showing the engaged and disengaged state of the clutches, brakes, and coupling of FIG. 2.

The vehicle operator changes the position of a gear selector lever by moving it among various ranges, including a manual (1M) range, drive (D or OD) range, and a reverse (R) range. Operation of the transmission in each of the gear ratios is described next with reference to the schedule of FIG. 3.

When the 1M range is selected, friction clutch 76 and friction actuated brake band 88 are applied, the other friction elements of the transmission, brake 96, clutch 78, and clutch 90 are disengaged. In the 1M range, one-way clutch 80 does not drive in either the drive or coast conditions. When a vehicle operator moves the gear selector lever to the 1M range, input shaft 26 drives gear wheel 57, on which sun gear 56 and ring gear 48 are formed, through clutch 76 and the first gear set 36. Gear wheel 57 is underdriven in relation to the speed of the input shaft. Ring gear 58 is held fixed against rotation through operation of brake band 88 and the output is taken at carrier 60 and output shaft 64. The final drive gear set, which includes pinion 66 and gear 68, drives the axleshafts of the vehicle through differential 70 during coast conditions. Engine braking is available in the 1M range even though coupling 80 does not drive, because brake band 88 continually provides a torque reaction by holding ring gear 58 against rotation.

When a vehicle operator moves the gear selector lever to the D-range or OD-range, six forward speed ratios can be produced. Clutch 76 is engaged while the first through fourth speed ratios are produced and brake 88 is disengaged. The third speed ratio is a direct drive ratio; the first and second speed ratios are underdrive ratios; the fourth and fifth speed ratios are overdrive ratios.

Ring gear 58 is held fixed against rotation, because the second gearset 30 is fixed to the transmission casing through operation of one-way coupling 80. Input shaft 26 underdrives gear wheel 57 due to the engagement of clutch 76, and the output is taken at carrier 60 and output shaft 64. There is no engine braking available during a coast condition because coupling 80 overruns.

A nonsynchronous upshift to the second speed ratio in the OD-range occurs when brake 96 is applied and clutch 76 is engaged. Gear wheel 57 is underdriven in relation to the speed of input shaft 26 due to the engagement of clutch 76. Sun gear 46 is held against rotation on the transmission housing 82 due to the engagement of brake 96. The output is taken at carrier 50 and output shaft 64. Engine braking is provided in coast conditions due to the continual engagement of brake 92.

To produce the third speed ratio in the OD-range, brake 96 is disengaged and clutch 78 is applied, while maintaining clutch 76 engaged. In this instance, gear wheel 57 and sun gear 46 are underdriven at the same speed in relation to the speed of input shaft 26 due to the engagement of clutches 76, 78. The output, on carrier 50 and output shaft 64, turns at that same speed because gear unit 44 is locked up. Engine braking is provided during a coast condition because there is a continuous direct drive connection between output shaft 64 and the input shaft.

The fourth speed ratio produced automatically with the gear selector in the OD-range is produced with clutches 76 and 90 engaged. Input shaft 26 underdrives gear wheel 57 through the first gear set 36 and clutch 76. Input shaft 26 overdrives ring gear 58 through the second gear set 30 and clutch 90. The output of gear unit 54 is taken at carrier 60 and output shaft 64. Due to the engagement of clutches 76 and 90, engine braking is available during coast condition because there is a continuous direct drive connection between the output shaft 64 and input shaft 26.

The fifth speed ratio is produced automatically with the gear selector in the OD-range by engaging clutches 78 and 90. Input shaft 26 underdrives sun gear 46 of the first gear unit through first gear set 36 and clutch 78. The input shaft 26 overdrives ring gear 58 of the second gear unit through second gear set 30 and clutch 90.

Since the carriers 50, 60 of the first and second gear units 44, 54 are mutually connected, and ring gear 48 and sun gear 56 are formed integrally with gear wheel 57, the speed of the output shaft 64 is established with respect to the speed of the input shaft given the relative sizes of the gears and pinions of the planetary gear units and the speed ratios produced by the first and second gear sets.

An upshift to the sixth speed ratio is produced in the OD-range by disengaging clutches 78, 90 and engaging brake 92 and clutch 90. Ring gear 58 is overdriven through gearset 30, and sun gear 46 is held against rotation. The carriers 50, 60, which are mutually connected, drive output shaft 64.

To produce reverse drive, clutch 78 and brake 88 are engaged and the other friction elements are disengaged. The input shaft underdrives sun gear 46 through gear set 36 and clutch 78. Ring gear 58 is fixed against rotation through gear set 30 due to the engagement of brake band 88. The speed of output shaft 64, which is drivably connected to the carriers 50, 60, is determined readily from the arrangement of gear units 44 and 54, given that the speed of ring gear 48 is equal to the speed of sun gear 56 and that the speed of the carriers 50, 60 is equal.

Having described a preferred embodiment of my invention, what I claim and desire to secure by U.S. Letters Patent is:

I claim:

1. A multiple-speed automatic transmission for motor vehicles, comprising:

an input shaft;

an output shaft;

a first gearset;

a second gearset;

first and second concentric gear units, each gear unit having a sun gear, ring gear, planet pinions meshing with the respective sun gear and ring gear, and carrier rotatably supporting the planet pinions, the ring gear of the first gear unit and sun gear of the second gear unit being mutually drivably connected, the carriers of the first and second gear units being mutually drivably connected and connected to the output shaft, the ring gear of the second gear unit being drivably connected to the second gearset;

first clutch means for alternately drivably connecting and releasing the first gearset and the mutually connected ring gear of the first gear unit and sun gear of the second gear unit;

second clutch means for alternately drivably connecting and releasing the sun gear of the first gear unit, first gearset and the mutually connected ring gear of the first gear unit and sun gear of the second gear unit;

first brake means for alternately holding the sun gear of the first gear unit against rotation and permitting said rotation;

third clutch means for alternately connecting and releasing the input shaft and second gearset; and second brake means for alternately holding the second gearset against rotation and permitting said rotation.

2. The transmission of claim 1 further comprising overrunning coupling means for alternately holding the second gearset and ring gear of the second gear unit against rotation and permitting said rotation depending on the directional sense said ring gear tends to rotate.

3. The transmission of claim 1 further comprising:

a housing fixed against rotation; and overrunning coupling means for producing a one-way drive connection between the housing and ring gear of the second gear unit.

4. The transmission of claim 1 further comprising:

a housing fixed against rotation; and a torque delivery path located between the ring gear of the second gear unit and housing including the second brake means and an overrunning coupling means for producing a one-way drive connection between the housing and ring gear of the second gear unit.

5. The transmission of claim 1 further comprising a gear wheel having the ring gear of the first gear unit and sun gear of the second gear unit formed integrally thereon, said ring gear formed on a radially inner surface of the gear wheel and said sun gear formed on a radially outer surface of the gear wheel.

6. The transmission of claim 1 wherein the sun gears, ring gears and planet pinions of the first and second gear units are substantially aligned radially with respect to a common axis.

7. A multiple-speed automatic transmission for motor vehicles, comprising:

an input shaft;

an output shaft;

a first gearset having a first pinion drivably connected to the input shaft, a first gear meshing with the first pinion, said first pinion driving the first gear at a higher speed than the speed gearset producing a speed reduction from the first pinion to the said gear;

a second gearset having a second pinion drivably connected to the input shaft, a second gear meshing with the second pinion, said gearset producing a speed increase from the second pinion to the second gear;

first and second concentric gear units, each gear unit having a sun gear, ring gear, planet pinions meshing with the respective sun gear and ring gear, and carrier rotatably supporting the planet pinions, the ring gear of the first gear unit and sun gear of the second gear unit being mutually drivably connected, the carriers of the first and second gear units being mutually drivably connected and connected to the output shaft, the ring gear of the second gear unit being drivably connected to the second gearset;

first clutch means for alternately drivably connecting and releasing the first gearset and the mutually connected ring gear of the first gear unit and sun gear of the second gear unit;

second clutch means for alternately drivably connecting and releasing the sun gear of the first gear unit, first gearset and the mutually connected ring gear of the first gear unit and sun gear of the second gear unit;

first brake means for alternately holding the sun gear of the first gear unit against rotation and permitting said rotation;

third clutch means for alternately connecting and releasing the input shaft and second gearset; and second brake means for alternately holding the second gearset against rotation and permitting said rotation.

\* \* \* \* \*